Patented May 19, 1931

1,806,533

UNITED STATES PATENT OFFICE

JOHN B. HAKIM, OF DANBURY, CONNECTICUT

CARROTING COMPOSITION

No Drawing. Application filed February 14, 1929. Serial No. 340,020.

This invention relates to a composition for use by hatmakers, more particularly a composition for carroting hats, etc.

The primary object of this invention is to provide an improved carroting composition having associated therewith a solvent for the fats and oils of the hair upon which it is used, means for binding or matting the fur to enable the hatter to more readily form a body therefrom and having incorporated therewith a substance coacting with the other ingredients for imparting to the body shininess and increasing the cohesion thereof when the same is pressed under relatively high temperature.

The formula for the present improved carroting composition is as follows:—

| | Per cent |
|---|---|
| Sodium hydroxide | 2.000 |
| Sodium silicate | .014 |
| Aluminum | .015 |
| Water | 97.971 |

The sodium hydroxide acts as a solvent for the fats and oils of the fur upon which the composition is used and for other impurities found therein. The sodium silicate serves as a binder for the fur or felt formed therefrom and the aluminum imparts shininess to the felt and increases the cohesion of the elements thereof when the same is pressed under a relatively high temperature.

The method of forming the composition is as follows:—

The sodium hydroxide is first dissolved in substantially 50% of the water and to this solution the aluminum in pulverized form is added. The sodium silicate is then mixed with the remainder of the water and the two solutions are then combined. The preparation is then ready to be used in the usual manner.

While the formula given calls for the hydroxide of sodium and silicate of sodium, it is, of course, to be understood that I do not wish to be limited to the use of these specified chemicals for potassium hydroxide and potassium silicate could be used and the same results obtained, however, the sodium hydroxide and silicate is preferred because of its cheapness.

It is to be noted that whatever hydroxide or silicate is employed, the metal constituent of each should be the same, that is, a sodium hydroxide should not be employed with potassium silicate or vice versa.

Having described my invention, what I claim is:—

1. An improved carroting composition consisting of the reaction product of a solution of caustic alkali, an alkali silicate and aluminum.

2. An improved carroting composition consisting of an aqueous solution of sodium hydroxide, sodium silicate and sodium aluminate.

3. An improved carroting composition made up of the following ingredients taken in the following approximate proportions:—

| | Per cent |
|---|---|
| Sodium hydroxide | 2.000 |
| Sodium silicate | .014 |
| Aluminum | .015 |
| Water | 97.971 |

4. An improved carroting composition consisting of a solution of alkali aluminate, a silicate of the alkali group, and an excess of the hydroxide of the alkali of the aluminate.

In testimony whereof I hereunto affix my signature.

JOHN B. HAKIM.